Aug. 18, 1970  H. H. HOEHN ET AL  3,524,546
PERMEATION SEPARATION WITH ACID-GRAFTED NYLON MEMBRANES
Filed Oct. 11, 1967  2 Sheets-Sheet 1

INVENTORS
HARVEY H. HOEHN
DONALD G. PYE
BY
James H. Ryan
ATTORNEY

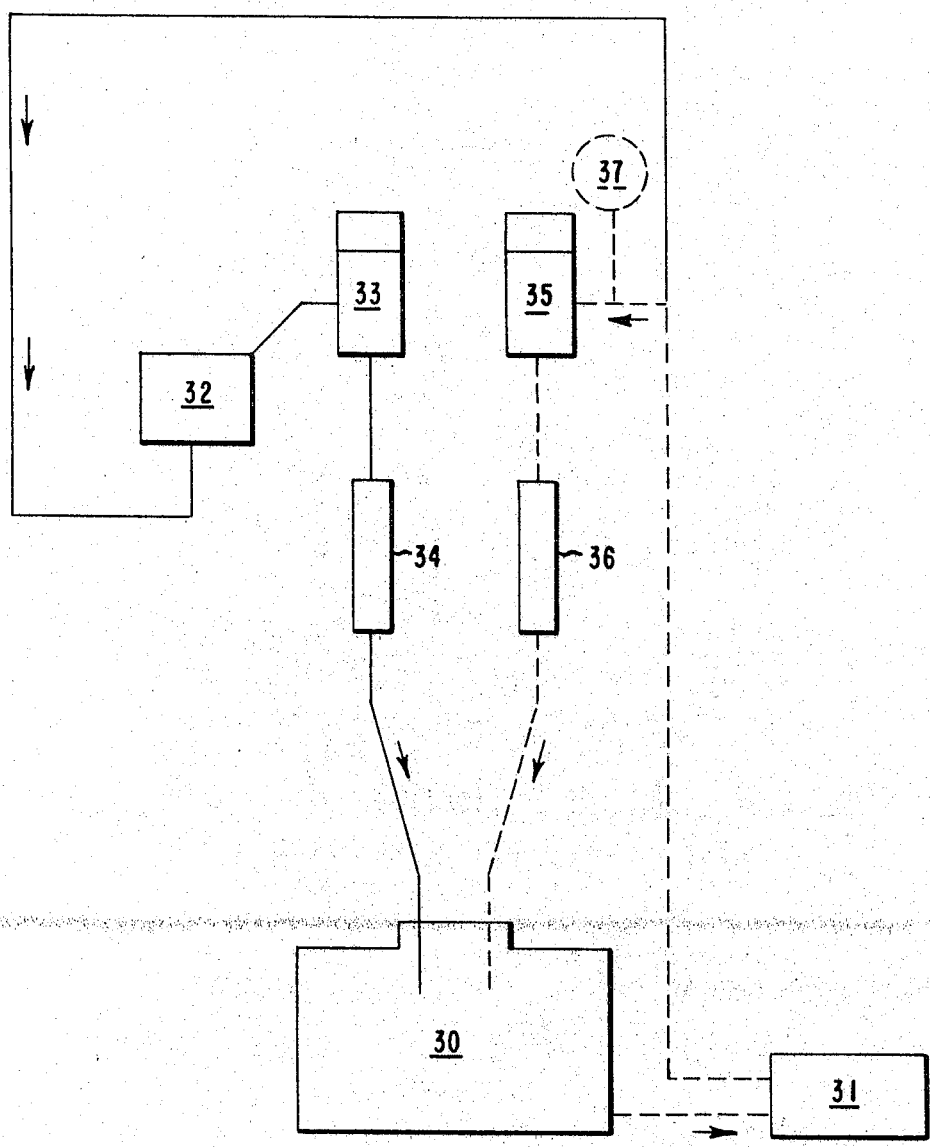
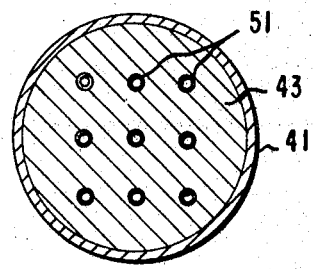

United States Patent Office 3,524,546
Patented Aug. 18, 1970

3,524,546
PERMEATION SEPARATION WITH ACID-GRAFTED NYLON MEMBRANES
Harvey H. Hoehn and Donald G. Pye, Wilmington, Del., assignors to E. I. du Pont de Nemours and Company, Wilmington, Del., a corporation of Delaware
Filed Oct. 11, 1967, Ser. No. 678,148
Int. Cl. B01d 13/00, 31/00
U.S. Cl. 210—23          12 Claims

ABSTRACT OF THE DISCLOSURE

Process for separating the components of fluid mixtures, particularly the desalination of sea water, by the use of membranes formed from copolymers of nylon grafted with titratable acid groups, or preferably, the metal salts thereof, and the membranes themselves.

FIELD OF THE INVENTION

This invention is concerned with, and has as its principal objects provision of, a new process for the permeation separation of fluid mixtures and solutions and novel permeability separatory elements, or membranes, for carrying out the process.

DESCRIPTION OF THE PRIOR ART

Permeation separation procedures have been extensively examined for separating the components of fluid mixtures and solutions by osmosis and by ultrafiltration, i.e., reverse or pressure osmosis. Desalination of sea water and brackish water is a representative field in which such separations have been studied. Other fields include detoxication of industrial wastes and the treatment of sewage.

Ultrafiltration processes have appeared particularly attractive. In such processes a pressure differential is established between the two faces of a membrane so that the pressure on the fluid mixture or solution to be separated, as compared to the separated fluid phase, exceeds the normal static osmotic pressure of such fluid against the membrane being employed. In this manner, the fluid component which can pass through the membrane is forced out of the charging fluid and is obtained in undiluted form.

The key factor in such a separation is the permeation membrane itself. It must be formed from a material having some chemical stability since stability affects both membrane life and fluid-separation properties. It must have a characteristic selectivity for performing a useful separation by passing some components of the fluid to be treated and holding back others. Furthermore, it must have mechanical strength to withstand pressure under the conditions of the separation, and it must have a sufficient throughput rate to accomplish its characteristic separation in a practical length of time.

Evident desirable characteristics in the membrane employed are affected both by the material from which the membrane is made and by the physical configuration thereof. Membranes developed heretofore have generally possessed one of two physical configurations. Probably the better known of these is simply a porous film permeable to water but less permeable to included impurities under the conditions, chiefly of pressure, employed. Such a film membrane is shown, for example, in the Loeb and Sourirajan U.S. Pat. 3,133,132, where a cellulosic ester is used as the film-forming material. In operation, saline or other impure water is merely forced through the film, the impurity passing through less readily than the water.

A second type of membrane consists of a bundle of hollow fibers formed from a water-permeable material. One or both of the ends of the bundle, which may contain millions of individual fibers, are "potted" or embedded in some plastic or other retaining material and the whole encased in a housing with liquid inlet and outlet means. Saline water is forced into the housing under pressure and purified water is drawn out through the ends of the hollow fibers. The Mahon U.S. Pat. 3,228,876 and 3,228,877 disclose such hollow-fiber membranes and their use, cellulose triacetate being the material from which the bundles are made in each instance. Hollow-fiber bundles serving as the basis for such membranes may themselves be prepared as disclosed in the Breen and Pamm U.S. Pat. 2,999,296 or British Pat. 843,179.

THE DRAWINGS

The present invention concerns the use of a particular class of materials as permeation membranes which accomplish highly useful separations in either of the physical configurations noted above, are physically strong, and are characterized by exceptionally advantageous throughput rates when compared to known permeation membranes. Both the use of the membranes and the membranes themselves will be understood in more detail from the remainder of the specification and from the drawings in which the same numeral represents identical parts and wherein:

FIG. 3 is a section along line 3—3 of FIG. 2; and

FIG. 4 is a largely self-explanatory diagram of a pumping and control system usable with a permeation cell of FIG. 1 or FIG. 2.

Figure 1:
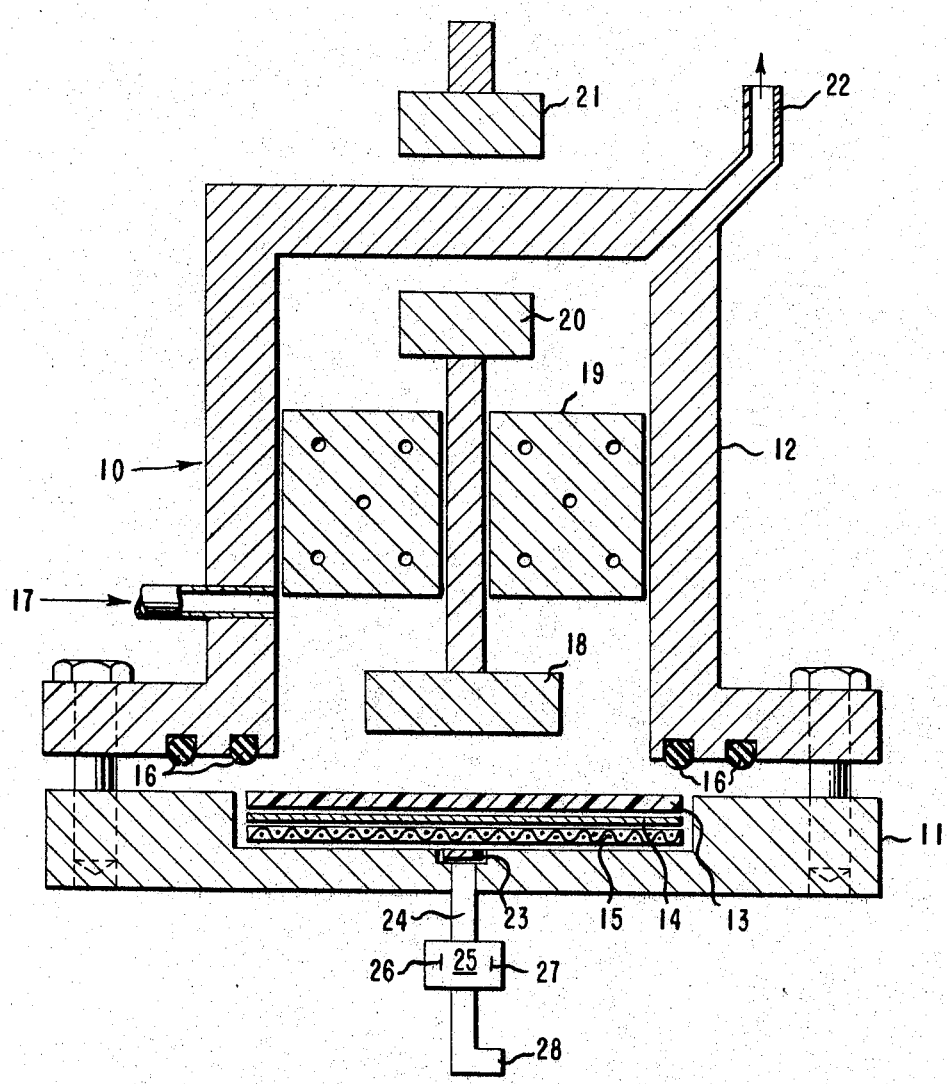
FIG. 1 is a section of a permeation cell showing one, i.e., the film, form of the membrane of the present invention.

Referring to FIG. 1, the base section 11 and upper section 12 of the permeation cell 10 are machined from blocks of rustproof metal. Film 13, the semipermeable membrane, is a disk mounted on a layer of filter paper 14 against a stainless steel wire screen 15. When upper part 12 of the cell is bolted to lower part 11, synthetic elastomer O-rings 16 seat firmly around the periphery of the membrane and against the metal. The inlet 17 for feed fluid into the cell is adjacent to the membrane, and the fluid is agitated by a magnetically driven stirrer blade 18 positioned by support 19 and controlled by internal and external magnets 20 and 21 to ensure the contact of fresh fluid with the membrane surface at all times. Removal or recirculation of the feed fluid is provided through the feed exit 22. Fluid passing through membrane 13 is collected through a metal frit 23 into a small conductivity cell 25 where electrical connections 26 and 27 permit determination of salt content to be made by a conductivity bridge (not shown). From conductivity cell 25 the fluid passes into a pipe 28 and its volume and flow rate are observed.

Figure 2:
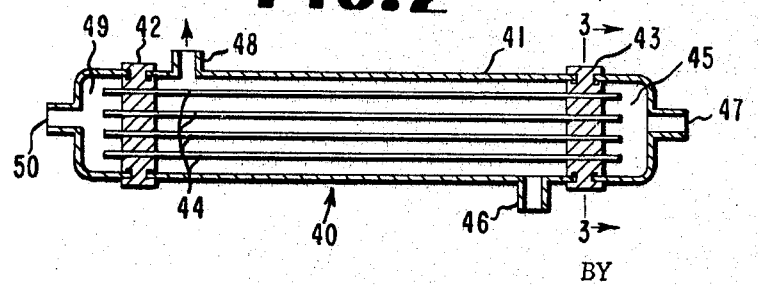
FIG. 2 is a section of another type of permeation cell having a preferred form, i.e., the hollow-fiber form, of a membrane of the invention.

FIG. 2 shows an alternative form of permeation cell 40 in which casing 41 carries, potted in plugs 42 and 43, a bundle 44 of hollow grafted nylon fibers serving as the preferred membrane of the invention, one end of the bundle 44 extending through plug 43 into collecting chamber 45 and the other through plug 42 into chamber 49. Fluid, fed into cell 40 through feed 46 and dialyzed through walls of the fibers and passed through the hollow interior thereof into collection chambers 45 and 49, is withdrawn through exits 47 and 50. Excess fluid not dialyzed is withdrawn through casing exit 48.

FIG. 3 shows a section through plug 43 mounted in casing 41 disclosing the hollow ends of the individual fibers 51 (not in scale) extending through the plug. It will be understood that millions of fibers actually may be in bundle 44.

FIG. 4 shows a pumping system providing circulation of feed fluid and maintenance of pressure inside a permeation separation cell. Fluid is circulated from reservoir 30 by pump 31 through the cell represented by a block 32 (which may be either of the forms shown by FIG. 1 and FIG. 2), the pressure regulator 33, the flow meter 34 and back to reservoir 30. Temperature is controlled as desired by placing the cell and permeate measuring equipment in an air bath (not shown) monitored by a thermocouple (also not shown) mounted adjacent to the test film inside the cell. Alternatively, the cell may be placed in a water bath. Regulator 35 and flow meter 36 permit excess fluid from the pump to by-pass the permeation cell and to be returned to the reservoir, the by-pass portion of the system being indicated by dotted lines. Pressure is monitored by gauge 37. Conventional piping is, of course, supplied connecting the units of the control system as indicated.

DETAILS OF THE INVENTION

The critical part of the present invention is the semipermeable membrane shown in two forms in FIG. 1 and FIG. 2. The material from which both forms are made is a graft copolymer characterized by recurring

atoms as an integral part of the polymer chain and bearing at least 300 titratable acid groups per million grams of polymer, at least about 200 of said acid groups being chemically bonded by a carbon-to-carbon linkage to a caternarian carbon of the said nitrogenous condensation polymer and the said acid so linked being at least one carbon atom removed from the said caternarian carbon. In the semipermeable membranes in this invention the pendant acid groups are preferably in the form of their metal salts.

By the expression "300 titratable acid groups per $10^6$ grams of polymer" is meant the number of equivalents of —COOH ends per $10^6$ grams of polymer, for example, as determined by the method of Taylor and Waltz, Analytical Chemistry, 19, 448 (1947). If the graft copolymer is insufficiently soluble in hot benzyl alcohol, a satisfactory determination of acid groups may be made by boiling the finely divided copolymer sample gently in 0.1 N NaOH followed by back titrating excess base with 0.1 N HCl using bromocresol green indicator. When the graft copolymer has its acid groups in the form of metal salts, these groups are first converted to acid form by hydrolysis of the salt with strong acid prior to the dtermination noted above.

When the grafter moiety of the graft copolymer is acrylic acid, a concentration of 300 titratable acid groups per $10^6$ grams of polymer is obtained when the graft copolymer shows a grafted weight gain of acrylic acid of about 3%. Thus as a rule of thumb it may be stated that nitrogenous polymers as defined above having 3% by weight of more of grafted acrylic acid contain in excess of 300 titratable acid groups per $10^6$ grams of polymer.

By "metal" in metal salts is meant any element of atomic number 3, 4, 11–13, 19–32, 37–51, 55–84, 87–103 and above. Preferred metals are Li, Na, K, Mg, Ca, Sr, Ba, Al, Mn, Fe, Ni, Cu, Zn, Ag, Cd, Au, Hg and Pb. Metal salts of the grafted acids are obtained either by grafting a metal salt of a polymerizable organic acid or by grafting the organic acid and then converting it to the corresponding metal salt by neutralization with a metal hydroxide or oxide or by metathesis.

Graft copolymers of which the permeation membranes above are made are described in coassigned U.S. Pat. No. 3,099,631 (Tanner). The substantially linear nitrogenous condensation polymers from which these graft copolymers are prepared include the polyamides which are characterized by recurring

links in the polymer chain where R may be hydrogen or an organic radical. High molecular weight fiber-forming polyamides, now well known as "nylons," are preferred in forming these products.

Other well-known polymers comprehended in the defined class are the polyurethanes characterized by recurring

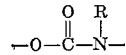

groups and polyureas characterized by

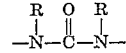

groups. Also included are those polymers with recurring main chain links such as

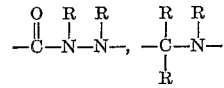

and the like. The R substituents on the nitrogen may be alike or different and are preferably hydrogen or a monovalent hydrocarbon radical. Preferably such hydrocarbon radical is free of aliphatic carbon-to-carbon unsaturation and contains no more than 18 carbon atoms.

Hydrophilic side chains are grafted onto such a nitrogenous polymer by known means such as by high energy ionizing radiation or by the action of free radical-generating catalysts. The material to be grafted is preferably a polymerizable unsaturated organic acid or metal salt of such acid. The material to be grafted may be applied to the nitrogenous polymer either before, during, or after application of the grafting means. Suitable polymerizable organic acids include acrylic, methacrylic, ethacrylic, crotonic, propiolic, styrenecarboxylic, maleic, dichloromaleic, fumaric, butadienecarboxylic, itaconic, styrenesulfonic, ethylenesulfonic acids and the like. Allyl sulfuric acid may also be used. These acids may be in the form of their metal salts when grafted or may be converted to metal salt form after grafting.

Semipermeable membranes for use in the present invention are prepared from such graft copolymers by carrying out the grafting process on a preformed membrane such as a film or hollow fiber of the nitrogenous polymer or by first preparing the graft copolymer and then forming it into a membrane such as film or hollow fiber by extruding or spinning it from melt or from solution in a suitable solvent.

In the preferred embodiment of this invention (FIGS. 2 and 3), hollow fibers of a substantially linear nitrogenous polymer as described above are cut to substantially identical length. A bundle of such fibers in parallel lengths may be combined into a permeator by potting a substantial length of the ends of the fibers in a resin, the resin filling the interstices between the ends of the fibers and providing a rounded or otherwise structured shape to the ends of the bundle so that the ends may then or later be mounted in a leakproof form into conventional permeator hardware. The bundle, whether potted or unpotted, in mounted or unmounted form, is subjected to radiation grafting as described above, the ends of the bundle being shielded from the radiation so that no grafting occurs there. The result is a permeator unit consisting of a bundle of hollow fibers, the two end portions of which contain hollow fibers composed of the unmodified nitrogenous polymer, and the center portion of which contains hollow fibers composed of the nitrogenous polymer having hydrophilic groups.

Such as assemblage has the great practical advantage that the portions of the hollow fibers to be potted are free of hydrophilic groups and thus do not swell on contact with aqueous materials. Such swelling inside the potted ends could close the holes in the hollow fibers and destroy the utility of the permeator. In the central portion of the bundle which is not embedded in a potting resin, swelling of the fibers can take place freely in all directions with little or no effect on the patency of the central holes in the hollow fibers.

EMBODIMENTS OF THE INVENTION

There follow some nonlimiting examples which illustrate the invention in more detail. Examples 1–29 show the use of a semipermeable membrane of the film type as illustrated in FIG. 1. Examples 30 and 31 show the use of the preferred membrane of the invention, i.e., one of the fiber-bundle type, as particularly illustrated in FIG. 2 and FIG. 3. In all of these examples, a control system essentially that of FIG. 4 was used. Temperatures were ambient atmospheric. Parts and percentages are given in terms of weight unless otherwise noted.

With specific regard to Examples 1–29:

66 nylon film membranes 66 nylon film in thicknesses of 0.5, 1, and 2 mils was prepared from 66 nylon flake (Zytel® 43, Du Pont Company) by extruding at temperatures in the range of 288–296° C. through a slit die onto a polished quench roll, controlled at 66–77° C., at a rate of 100–150 linear feet/minute with an air gap between the die and the quench roll of 4–7".

Permeation flow measurements

The permeation flow rate W through the film membrane was calculated from the test data by the formula $$W = \frac{Q \times t \times 10^6}{A \times \Delta P}$$

where:

Q is the permeate flow in gallows per day;
$t$ is the thickness of the permeation membrane in mils;
A is the area of the permeation membrane in square feet; and
$\Delta P$ is the pressure of the feed solution in p.si.g. minus the difference in the osmotic pressures of the feed solution and the permeate in p.s.i.g.

Feed solutions

Examples 1–29 refer to tests with two types of saline solutions. One of the saline solutions used was a 3.5% NaCl solution (35,000 p.p.m. NaCl), a concentration of salt about equal to the mineral content of sea water. With this solution, the permeation data were not complicated by unknown factors regarding the effect of the various ions present in sea water or synthetic sea water. The salt content of the permeate, being a pure NaCl species, was easily monitored by conductivity measurements. Tests with 3.5% NaCl solution were run at 30° C. and 1500 p.s.i.g. unless otherwise indicated.

A brackish sulfate mixture containing 700 p.p.m. of calcium sulfate (0.07%), 400 p.p.m. of magnesium sulfate (0.04%), and 400 p.p.m. of sodium sulfate (0.004%), making a total solids content of 1500 p.p.m. of mixed sulfate (0.15%), was also used for desalination tests. This mixture was formulated to simulate many midcontinuent ground waters. Tests with the mixed sulfate solutions were run at 30° C. and 500 p.s.i.g. unless otherwise indicated.

Salt passage

Sale passage (SP) is defined as the percentage of the salt in the feed solution passing through the membrane with the permeate. It is determined from the conductivity of the permeate and the salt content in the feed solution.

In the permeator of FIG. 1, a 1-mil unmodified 66 nylon film that had been prepared by extrusion showed a flow rate (W) of 3.6 and a salt passage of 7% (2500 p.p.m.) for 3.5% NaCl feed at 1500 p.s.i.g. With the mixed sulfate feed at 500 p.s.i.g., unmodified 66 nylon showed a W of 6 and a salt passage of 13% (196 p.p.m.).

EXAMPLE 1

*Part A.*—A nylon film 0.5 mil thick, prepared by melt extrusion of a polyamide of composition 66/6 (90/10) having a relative viscosity of 180–220, was grafted by swelling the film with acrylic acid and then subjecting the swollen film to radiation under an electron beam. The film sample 4" x 4" (0.1904 g.) was soaked in a bath of glacial acrylic acid containing 220 p.p.m. of p-methoxyphenol (inhibitor) at room temperature for 17 hours. The film was then removed from acrylic acid, placed between paper towels to remove the excess liquid from the surface, laid on paper towels and subjected to irradiation. Irradiation consisted of passing the swollen film five times under a Van de Graaff electron beam operated at 2 MEV and 250 microamperes for a dosage of about 63 watt sec./cm.² The irradiated film weighed 0.4328 g. which corresponds to a graft level of 128% acrylic acid.

*Part B.*—A disc (1⅞") for permeation testing was cut from a grafted film sample and placed in a desalination cell without a stirrer. The film was placed on filter paper supported by a porous metal frit. The pressure to drive the reverse osmosis was generated by applying nitrogen pressure to the feed solution. This permeation test was carried out at room temperature. The water permeation (W) of the grafted film was 15 with 3.5% NaCl feed and the salt content of the product was 1700 p.p.m. (95% rejection of NaCl, 5% salt passage). Water permeability of the parent nylon film used in this test showed a W of 5 with 9% salt passage (3100 p.p.m.) when tested with the stirred desalination cell described above.

EXAMPLE 2

*Part A.*—A piece of 66 nylon film 1 mil thick was sealed in a polyethylene bag fitted with inlet and outlet hose connections. The bag was evacuated and flushed with nitrogen several times to remove air, the inlet and outlet were capped with eyedropper bulbs and the bag containing film placed on a bed of Dry Ice. The film was passed under an electron beam operated at 2 MEV and 250 microamperes for a total of five passes and a dosage of about 63 watt sec./cm.². The film was then covered with Dry Ice and taken to the laboratory for treatment with acrylic acid. The film and bag were taken from the Dry Ice, placed in a tray and an aqueous solution of 50% acrylic acid by volume was introduced into the bag. The film was allowed to soak in the acrylic acid solution for 15 minutes whereupon it was removed and placed in a tray of distilled water for 5 minutes. The film was then transferred to a tray containing 5% aqueous sodium carbonate and allowed to soak in this solution for 30 minutes. This was followed by transferring the film to a distilled water bath, allowing it to soak 5 minutes, transferring it to fresh water for three additional 5-minute soakings. The film was then allowed to dry overnight in a ventilated hood. The original film weighed 1.6430 g. and the grafted, dried film weighted 2.5080 g. The gain in weight corresponded to a graft level of 53% acrylic acid sodium salt by weight.

*Part B.*—This film was tested in the permeator of FIG. 1 and showed a W of 2610 at 57% salt passage for the 3.5% NaCl feed and a W of 1990 at 24% salt passage with a brackish sulfate feed. This example illustrates the high flow rates that can be obtained by grafting acrylic acid to the nylon and subsequently converting the carboxyl groups to the sodium salt.

EXAMPLE 3

A piece of 66 nylon film 1-mil thick was grafted by a procedure that was analogous to the one described in Example 2 with the exception that the film was given 10 passes under the Van de Graaff in the dosing step instead of 5. The film showed a weight gain of 82%. In the permeation test, the film showed a W of 3280 at 72% salt passage for 3.5% NaCl feed and a W of 2780 at 29% salt passage for the mixed sulfate feed.

EXAMPLE 4

*Part A.*—A sheet of 1-mil 66 nylon film was placed in a polyethylene bag but the bag was not sealed. The bag was placed on Dry Ice and given five passes under the Van de Graaff electron beam operated at 2 MEV and 250 microamperes. The film was then covered with Dry Ice and brought to the laboratory for treatment with acrylic acid. The irradiated film was transferred from the bag to a tray containing 25% acrylic acid (75% water) and allowed to soak at room temperature for 15 minutes. The film was then transferred to distilled water and washed for 5 minutes. After six washes of this type, the film was hung in the hood to dry. The film showed a weight gain of 14% grafted acrylic acid.

*Part B.*—The film of Part A was divided and one section was tested in the permeator of FIG. 1. It showed a W of 40 at 14% salt passage for 3.5% NaCl feed solution.

*Part C.*—The remainder of the film from Part A was again grafted by repeating the procedure of Part A. The film showed an additional weight gain of 10.8% grafted acrylic acid.

*Part D.*—The film from Part C was tested in the permeator of FIG. 1. It showed a W of 65 at a salt passage of 9.4% for 3.5% NaCl feed solution.

EXAMPLE 5

*Part A.*—A piece of extruded 1-mil 66 nylon film was sealed in a polyethylene bag fitted with an inlet and outlet. The air in the bag was displaced with nitrogen, the bag placed on a bed of Dry Ice and given five passes under the Van de Graaff electron beam operated at 2 MEV and 250 microamperes. The film was covered with Dry Ice and brought to the laboratory for treatment with acrylic acid solution. The bag containing the film was placed in a tray and filled with 25% aqueous deoxygenated acrylic acid and the film allowed to soak in this solution at room temperature for 15 minutes. The film was then removed from the acid solution and given six washes with distilled water of 5 minutes' duration each. The film was then hung in the hood to dry overnight. Gain in weight of the film indicated a graft level of 33% acrylic acid.

*Part B.*—A permeation test on a specimen cut from this sample of film showed a W of 88 at 9% salt passage (3.5% NaCl feed).

EXAMPLES 6–14

In each of these examples a 1-mil extruded film of 66 nylon was radiation-grafted with acrylic acid using the procedural steps of Example 4, Part A, but with the variations indicated below. Samples of the treated films were titrated by the method of Taylor and Waltz (supra) and the results are shown in terms of weight percent of COOH groups. The treated films were tested in the permeator of FIG. 1 with the results indicated:

| Ex. | Passes under the electron beam | Conc. of Aq. acrylic acid | Total wt. gain | wt. percent COOH groups | Permeation tests | | | |
|---|---|---|---|---|---|---|---|---|
| | | | | | 3.5% NaCl | | 0.15% mixed sulfate | |
| | | | | | W | SP | W | SP |
| 6 | 2 | 25 | 27.1 | 5.4 | 26 | 9.2 | | |
| 7 | 5 | 25 | 39.7 | 7.5 | 61 | 10 | 23 | 2.8 |
| 8 | 10 | 25 | 61.0 | 11.5 | 183 | 9.1 | 24 | 6.0 |
| 9 | 2 | 50 | | 6.4 | 83 | 21 | | |
| 10 | 5 | 50 | | 9.9 | 214 | 18 | 44 | 2.6 |
| 11 | 10 | 50 | | 11.7 | 272 | 18 | 41 | 6.2 |
| 12 | 2 | 75 | 24.8 | 5.6 | 15 | 39 | | |
| 13 | 5 | 75 | 45.2 | 9.1 | 336 | 29 | 166 | 5.0 |
| 14 | 10 | 75 | 63.2 | 9.6 | 540 | 26 | 810 | 15 |

EXAMPLES 15–29

In each of these examples the procedural steps of Example 2, Part A, for radiation-grafting with acrylic acid were repeated except that the aqueous solution of acrylic acid used was of 15% concentration instead of 50%. After soaking in the 15% acrylic acid solution for 15 minutes, each film was then placed in distilled water for 5 minutes. The washed film was then given either one or two 30-minute immersions in the metal-containing aqueous solutions indicated, followed by soaking in water and drying. The total weight gain of metal acrylate salt is shown. In some examples, the content of metal ion taken up was determined analytically as indicated. The films containing grafted metal salts were then tested in the permeator of FIG. 1 with the results indicated.

| Example | 1st treatment | 2nd treatment (if any) | Total wt. gain | Analysis | Permeation tests | | | |
|---|---|---|---|---|---|---|---|---|
| | | | | | 3.5% NaCl | | 0.15% mixed sulfate | |
| | | | | | W | SP | W | SP |
| 15 | 5% $FeCl_3$ | | 22.1 | Fe 0.33% | 66 | 10 | 11 | 7 |
| 16 | 5% $AlCl_3$ | | 21.7 | Al 0.1% | 71 | 8 | | |
| 17 | 5% $ZnCl_2$ | | 28.8 | Zn 1.5% | 56 | 9 | 14 | 13 |
| 18 | 5% $MgCl_2$ | | 26.9 | Mg 0.4% | 85 | 12 | 22 | 2 |
| 19 | 5% $CaCl_2$ | | 42.6 | Ca 2.2% | 342 | 25 | 58 | 2 |
| 20 | 5% $Na_2CO_3$ | 5% $FeCl_3$ | 23.7 | Fe 0.63%, Na 0.007%. | 114 | 14 | 22 | 3 |
| 21 | 5% $Na_2CO_3$ | 5% $AlCl_3$ | 38.7 | Al 0.1%, Na 0.01%. | 224 | 15 | 46 | 1 |
| 22 | 5% $Na_2CO_3$ | 5% $ZnCl_2$ | 64.6 | Zn 9.33%, Na 0.15%. | 288 | 23 | | |
| 23 | 5% $Na_2CO_3$ | 5% $MgCl_2$ | 47.8 | Mg 2.4%, Na 0.07%. | 612 | 37 | | |
| 24 | 5% $Na_2CO_3$ | 5% $CaCl_2$ | 40.9 | Ca 3.2%, Na 0.01%. | 1,160 | 44 | | |
| 25 | 5% LiOH | | 29.8 | | 1,370 | 60 | | |
| 26 | 5% NaOH | | 38.8 | | 890 | 43 | | |
| 27 | 5% KOH | | 58.7 | | 930 | 43 | | |
| 28 | 5% $Rb_2CO_3$ | | 60.2 | | 730 | 40 | | |
| 29 | 5% CsOH | | 75.5 | | 1,670 | 63 | | |

With specific regard to Examples 30 and 31:

66 nylon fiber membranes 66 nylon hollow fibers were prepared from unmodified 66 nylon having a relative viscosity in the range of 45–53 (as defined in U.S. Pat. 2,385,890). The spinning equipment consisted of a screw melter and a 17-hole sheath core spinneret of the type shown in U.S. Pat. 2,999,296. Each hole in the spinneret had a plate hole diameter of 40 mils, an insert of 32 mils diameter, a slot width of 4 mils, and a center hole (for gas inlet) of about 17 mils diameter. The melter barrel was operated at about 283° C. and the spin block at about 277–285° C. Sand pack pressure was in the range of 2400–3000 p.s.i. with a feed rate of 1.5 g./minute/hole. The fibers leaving the spinneret were air-quenched without drawing and wound up at a rate of 1000 yards/minute.

Potting procedure

Resin for potting the ends of hollow fiber bundles was prepared by mixing 100 g. of an epoxy polymer modified with butyl glycidyl ether ("ERL 2795," Smooth-On Manufacturing Company), 16 g. of a modified aliphatic amine adduct (Sonite® 15, Smooth-On Manufacturing Company), and 20 g. of triphenyl phosphite (Mod-E-Pox®, Monsanto). The fiber ends were inserted in the resin in a suitable mold immediately after mixing and the resin was allowed to set up by storing at room temperature for 16–24 hours.

Feed solutions

The feed solutions of Examples 30 and 31 were a pure 0.5% NaCl solution and the mixed sulfate solution used with the film membranes.

EXAMPLE 30

*Part A.*—A fiber bundle was prepared consisting of 184 yarns, each of which contained 17 filaments of hollow nylon 66 fiber. The hollow fibers has an average I.D. of $20\mu$, and O.D. of $50\mu$ and a denier/filament of 6. The fiber hank was protected by a cover of nylon mesh. The fiber bundle, designed for use in ¼" permeator hardware, was placed in a polyethylene bag, and the bag was laid on a bed of Dry Ice. About 6" of the ends of the fibers was protected from radiation by shielding. The package was irradiated by passing it through the electron beam of the Van de Graaff six times. The beam was operated at 2 MEV and 250 microamperes. The fiber bundle was then removed from the bag and transferred to a 50% aqueous acrylic acid solution and allowed to soak at room temperature for 15 minutes. The bundle was then placed in distilled water for 5 minutes. This treatment was followed by transferring the bundle to a 5% aqueous sodium carbonate solution and allowing the bundle to soak at room temperature for 30 minutes. The neutralized bundle was then given four washes (5 minutes each) in distilled water at room temperature and hung in the hood to dry. The dried bundle weighed 17.57 g., an increase of 5.65 g. over the initial weight. From the increase in weight, it is estimated that the sodium acrylate graft level was about 48% by weight.

*Part B.*—The ends of this bundle were potted in resin for testing in a permeator of the type shown in FIG. 2. The bundle showed a permeation rate at 400 p.s.i.g. of 0.12–0.20 gal./ft.$^2$/day at 80% salt passage and 50% water recovery from 0.5% NaCl feed solution and 0.07 gal./ft.$^2$/day at 3% salt passage at 416 p.s.i.g. for the mixed sulfate feed solution at 27% water recovery.

*Part C.*—For comparison purposes, a test permeator was fitted with an unmodified 66 nylon hollow fiber element and examined for permeation performance with a saline solution containing 0.5% NaCl. Operating at 30° C. with a feed pressure of 425 p.s.i.g., the permeation rate was 0.002 gal./ft.$^2$/day and the salt passage was 18% at 3% water recovery. The permeator was operated with the feed solution on the outside of the hollow fibers with the flow countercurrent to the flow of the permeate product stream.

*Part D.*—A test permeator was fitted with a unmodified 66 nylon hollow fiber element and examined for permeation performance with a saline solution containing 0.15% of mixed sulfate. Operating at 30° C., 400 p.s.i.g. and 17% conversion, the permeation rate was 0.002 gal./ft.$^2$/day and the salt passage was 1%.

EXAMPLE 31

*Part A.*—In this example a bundle of 66 nylon hollow fibers similar to that used for Example 30 was treated under the Van de Graaff beam in the same fashion as described in Example 30, Part A. The bundle was transferred from the Dry Ice to 50% aqueous acrylic acid and allowed to soak at room temperature for 15 minutes. The bundle was then washed in distilled water six times changing the water after 5 minutes each time. The bundle was hung in the hood to dry. The final weight of the bundle was 14.81 g., an increase of 2.91 g. over the original weight. This corresponds to an acrylic acid graft level of about 24%.

*Part B.*—The bundle was potted and mounted in permeator hardware for testing the permeation rate and salt rejection against sodium chloride and mixed sulfate feeds. The bundle showed a permeation rate of 0.016 gal./ft.$^2$/day at 415 p.s.i.g. with a 24% salt passage at 14.8% water recovery for the 0.5% NaCl feed and a rate of 0.015 gal./ft.$^2$/day at 418 p.s.i.g. and a 2% salt passage at 10.2% water recovery for the mixed sulfate feed.

The foregoing detailed description has been given for clarity of understanding only and no unnecessary limitations are to be understood therefrom. The invention is not limited to the exact details shown and described for obvious modifications will be apparent to those skilled in the art.

We claim:

The embodiments of the invention in which an exclusive property or privilege is claimed are defined as follows:

1. A permeation separation process comprising passing, by means of pressure applied thereto
    a fluid having a plural number of components including ionic constituents
    through
    a semipermeable membrane formed from a synthetic high molecular weight nitrogenous condensation polymer characterized by recurring $$-\overset{|}{\underset{}{N}}-$$

atoms as an integral part of the polymer chain,
    said linear nitrogenous condensation polymer having grafted thereto groups of allyl sulfuric acid or of a polymerizable organic acid or a metal salt thereof to the extent of at least about 300 titratable acid groups per million grams of polymer, at least about 200 of said acid groups being chemically bonded by a carbon-to-carbon linkage to a catenarian carbon of the said nitrogenous condensation polymer and the said acid so linked being at least one carbon atom removed from said catenarian carbon.

2. The process of claim 1 wherein the fluid is saline water.

3. The process of claim 1 wherein the semipermeable membrane is in the form of a film.

4. The process of claim 1 wherein the semipermeable membrane is in the form of a plurality of hollow fibers made from said nitrogenous condensation polymer and having grafted thereto said polymerizable acid or salt groups.

5. The process of claim 1 wherein the nitrogenous condensation polymer is nylon.

6. The process of claim 5 wherein acrylate groups are grafted to the nylon.

7. A semipermeable membrane adapted for use in the process of claim 1 comprising a substrate film formed from a synthetic high molecular weight nitrogenous condensation polymer characterized by recurring.

$$-\overset{|}{N}-$$

atoms as an integral part of the polymer chain,
said substrate film having grafted thereto groups of allyl sulfuric acid or of a polymerizable organic acid or a metal salt thereof to the extent of at least about 300 titratable acid groups per million grams of polymer, at least about 200 of said acid groups being chemically bonded by a carbon-to-carbon linkage to a catenarian carbon of the said nitrogenous condensation polymer and the said acid so linked being at least one carbon atom removed from said catenarian carbon.

8. In permeation separation apparatus, a membrane according to claim 7, means for contacting an ion-containing fluid with the membrane and means for supplying pressure to the fluid in excess of the osmotic pressure of the same.

9. A semipermeable membrane adapted for use in the process of claim 1 comprising at least one bundle of hollow fibers formed from a synthetic high molecular weight nitrogenous condensation polymer characterized by recurring $$-\overset{|}{N}-$$

atoms as an integral part of the polymer chain,
said fibers having grafted thereto groups of allyl sulfuric acid or of a polymerizable organic acid or a metal salt thereof to the extent of at least about 300 titratable acid groups per million grams of ploymer, at least about 200 of said acid groups being chemically bonded by a carbon-to-carbon linkage to a catenarian carbon of the said nitrogenous condensation polymer and the said acid so linked being at least one carbon atom removed from said catenarian carbon.

10. In permeation separation apparatus, a membrane according to claim 9, means for contacting an ion-containing fluid with the membrane and means for supplying pressure to the fluid in excess of the osmotic pressure of the same.

11. A semipermeable membrane of claim 9 wherein the fibers are formed from nylon.

12. A semipermeable membrane of claim 11 wherein the fibers have acrylate groups grafted thereto.

References Cited

UNITED STATES PATENTS

| 3,170,867 | 2/1965 | Loeb et al. | 210—22 |
|---|---|---|---|
| 3,220,960 | 11/1965 | Wichterle et al. | 210—321 X |
| 3,228,877 | 1/1966 | Mahon | 210—22 |
| 3,276,996 | 10/1966 | Lazare | 210—22 |

OTHER REFERENCES

Baddour et al.: "Expanded Glassy Polymers as Reverse Osmosis Membranes," from Office of Saline Water R&D Report No. 144, received in Patent Office Dec. 10, 1965, 81 pp., pp. 7 and 38–48 relied on.

Friedlander et al.: "Desalting by Reverse Osmosis," from Chem. Eng., June 6, 1966, pp. 145–148.

Lonsdal et al.: "Reverse Osmosis for Water Desalination," from Office of Saline Water R&D Report No. 150, received in Patent Office Dec. 16, 1965, 84 pp., pp. 75–84 relied on.

Merten et al.: "Reverse Osmosis for Water Desalination," Office of Saline Water R&D Report No. 208, received in Patent Office on Nov. 30, 1966, 217 pp., pp. 179–183 relied on.

REUBEN FRIEDMAN, Primary Examiner

F. A. SPEAR, JR., Assistant Examiner

U.S. Cl. X.R.

210—321, 500